United States Patent
Chida et al.

(10) Patent No.: US 7,455,618 B2
(45) Date of Patent: Nov. 25, 2008

(54) FLUID LEVEL REGULATING METHOD AND FLUID TEMPERATURE REGULATOR FOR AUTOMATIC TRANSMISSION

(75) Inventors: Ryuji Chida, Toyota (JP); Hiroshi Morioka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 402 days.

(21) Appl. No.: 11/446,176

(22) Filed: Jun. 5, 2006

(65) Prior Publication Data

US 2006/0276301 A1 Dec. 7, 2006

(30) Foreign Application Priority Data

Jun. 6, 2005 (JP) ............................. 2005-165806

(51) Int. Cl.
*F16H 59/00* (2006.01)
(52) U.S. Cl. ...................................................... 477/98
(58) Field of Classification Search .............. 123/41.33, 123/41.31; 477/98
See application file for complete search history.

(56) References Cited

U.S. PATENT DOCUMENTS

| 5,125,368 | A | 6/1992 | Tzavaras |
| 6,068,029 | A | 5/2000 | Toussagnon et al. |
| 6,511,396 | B1 * | 1/2003 | Tanizawa et al. ............ 475/161 |
| 6,899,074 | B1 * | 5/2005 | Carlsson ................ 123/196 AB |

FOREIGN PATENT DOCUMENTS

| EP | 0 589 507 A | 3/1994 |
| JP | A-58-156772 | 9/1983 |
| JP | A-07-149397 | 6/1995 |
| JP | A 11-325235 | 11/1999 |
| WO | WO 2006/013709 A | 2/2006 |

* cited by examiner

*Primary Examiner*—Dirk Wright
(74) *Attorney, Agent, or Firm*—Oliff & Berridge, PLC

(57) ABSTRACT

A fluid level of hydraulic fluid circulated in an automatic transmission is regulated while an internal combustion engine is running. When the fluid level is regulated, the hydraulic fluid is cooled, for example, by coolant passing through a radiator. In the cooling of the hydraulic fluid, the degree of cooling of the hydraulic fluid is controlled such that the temperature of the hydraulic fluid falls within an acceptable range. This prevents inaccurate fluid level regulation due to thermal expansion of the hydraulic fluid.

14 Claims, 7 Drawing Sheets

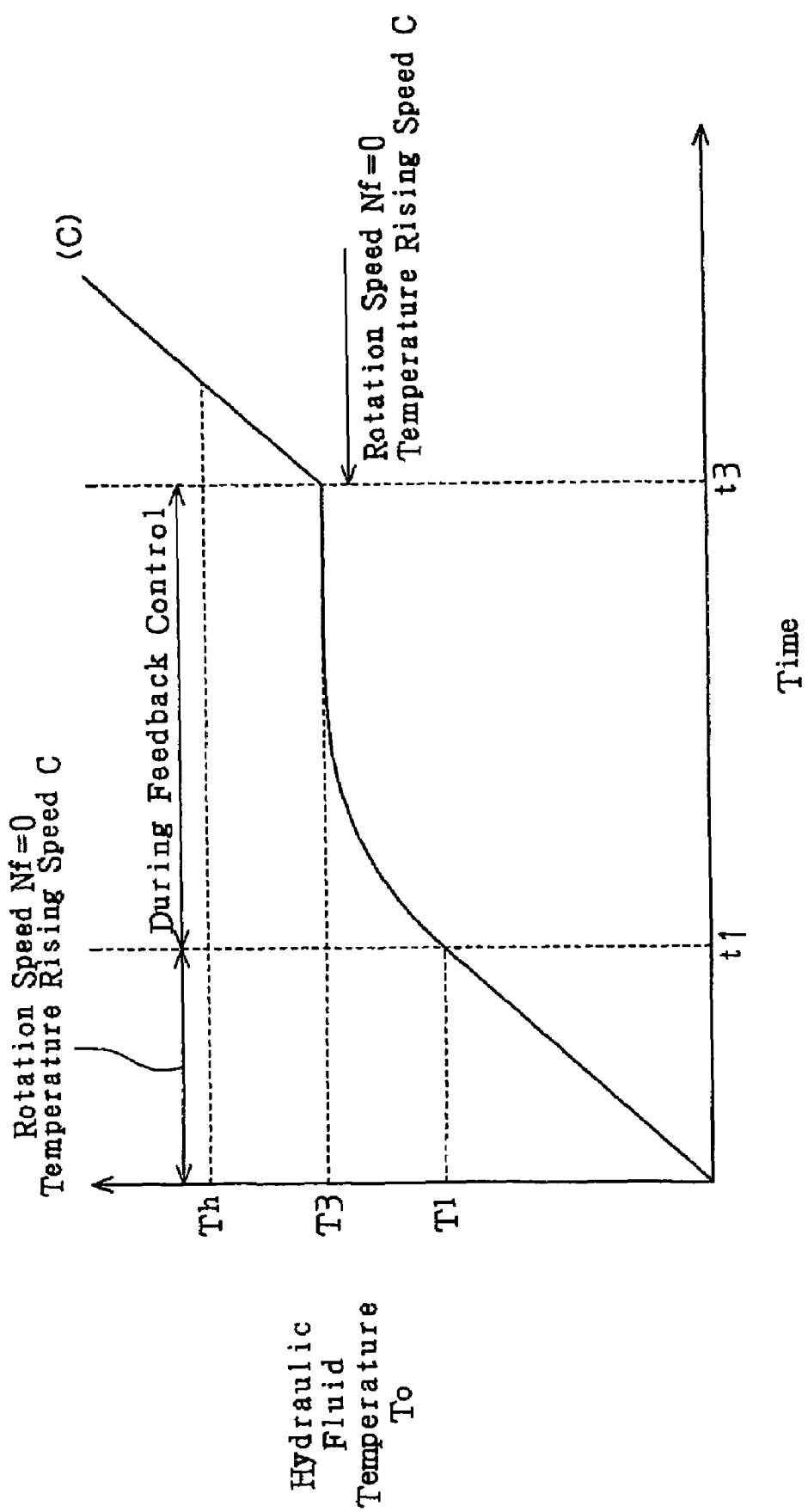

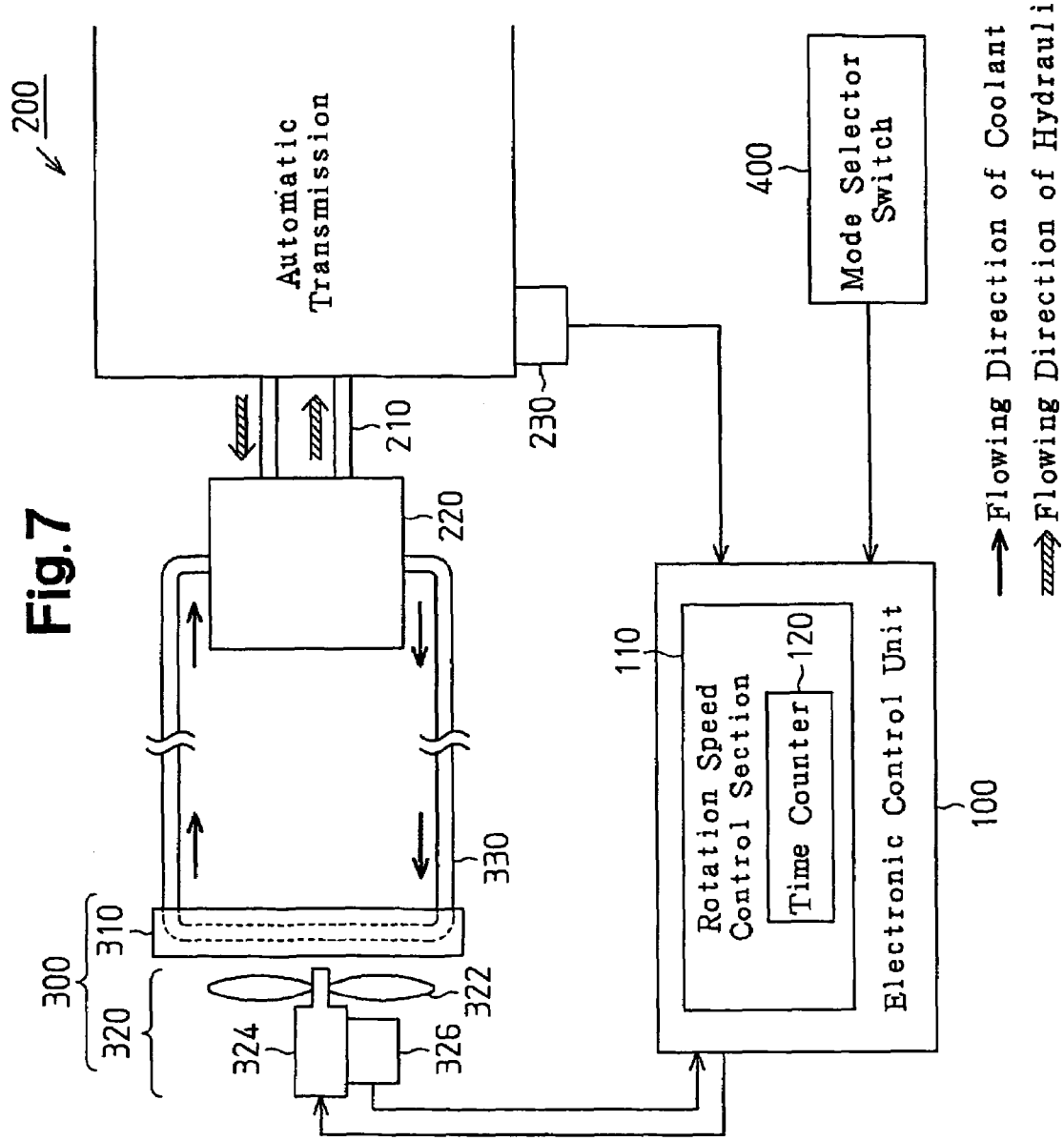

FLUID LEVEL REGULATING METHOD AND FLUID TEMPERATURE REGULATOR FOR AUTOMATIC TRANSMISSION

BACKGROUND OF THE INVENTION

The present invention relates to a fluid level regulating method and a fluid temperature regulator for an automatic transmission.

In an automatic transmission (AT) used for a vehicle, a torque converter and an auxiliary transmission mechanism are disposed, and "ATF" (automatic transmission fluid) is supplied as hydraulic fluid into these devices.

If the automatic transmission continues to be driven, there is a possibility that gears or the like forming the transmission are shaved to mix impurities into the hydraulic fluid, thereby reducing responsivity of the automatic transmission. Moreover, deterioration of the hydraulic fluid itself may reduce durability of a clutch and the like. Therefore, it is necessary to periodically change hydraulic fluid and to add a proper amount of hydraulic fluid again. In this case, however, a proper amount of hydraulic fluid needs to be ensured when the automatic transmission is actuated and therefore a fluid level of the hydraulic fluid needs to be regulated after the hydraulic fluid has been distributed inside the torque converter and the auxiliary transmission mechanism. Therefore, in a technique described in Japanese Laid-open Patent Application No. 11-325235, for example, fluid level regulation is carried out while keeping the engine at idle.

However, if the hydraulic fluid regulation is carried out while keeping the engine at idle in this manner, the temperature of the hydraulic fluid rises as the hydraulic fluid is changed to cause thermal expansion of the hydraulic fluid. Moreover, a rise in the temperature of the hydraulic fluid during the fluid level regulation varies widely depending on various configurations of the internal combustion engine and the automatic transmission. If the temperature of the hydraulic fluid rises excessively, an increase in the volume of the hydraulic fluid due to thermal expansion becomes large and the hydraulic fluid after the regulation may actually be insufficient. Therefore, it is difficult to accurately carry out the fluid level regulation of the hydraulic fluid while keeping the engine at idle.

SUMMARY OF THE INVENTION

Accordingly, it is an objective of the present invention to provide a fluid level regulating method and a fluid temperature regulator for an automatic transmission with which a fluid level regulation of hydraulic fluid can be carried out with accuracy during operation of an internal combustion engine.

To achieve the foregoing objective, one aspect of the present invention provides a method for regulating a fluid level of hydraulic fluid circulated in an automatic transmission while an internal combustion engine is running. The method includes: cooling the hydraulic fluid when the fluid level is regulated; and controlling the degree of cooling of the hydraulic fluid such that the temperature of the hydraulic fluid falls within an acceptable range.

Another aspect of the present invention provides a temperature regulator that regulates a temperature of hydraulic fluid circulated in an automatic transmission coupled to an internal combustion engine. The regulator includes a cooling device for cooling the hydraulic fluid, and a controller. When a fluid level of the hydraulic fluid is regulated while the engine is running, the controller controls the cooling device thereby regulating the degree of cooling of the hydraulic fluid such that the temperature of the hydraulic fluid falls within an acceptable range.

Other aspects and advantages of the invention will become apparent from the following description, taken in conjunction with the accompanying drawings, illustrating by way of example of the principles of the invention.

BRIEF DESCRIPTION OF THE DRAWINGS

The invention, together with objects and advantages there of, may best be understood by reference to the following description of the presently preferred embodiments together with the accompanying drawings in which:

FIG. 6 is a time chart showing changes in the temperature of hydraulic fluid over time; and FIG. 7 is a block diagram showing a relationship between a fluid temperature regulator and its peripheral structure according to a third embodiment of the present invention.

DETAILED DESCRIPTION OF THE PREFERRED EMBODIMENTS

A fluid level regulating method and a fluid temperature regulator for an automatic transmission according to a first embodiment of the present invention will be described with reference to FIGS. 1 to 5.

Figure 1:
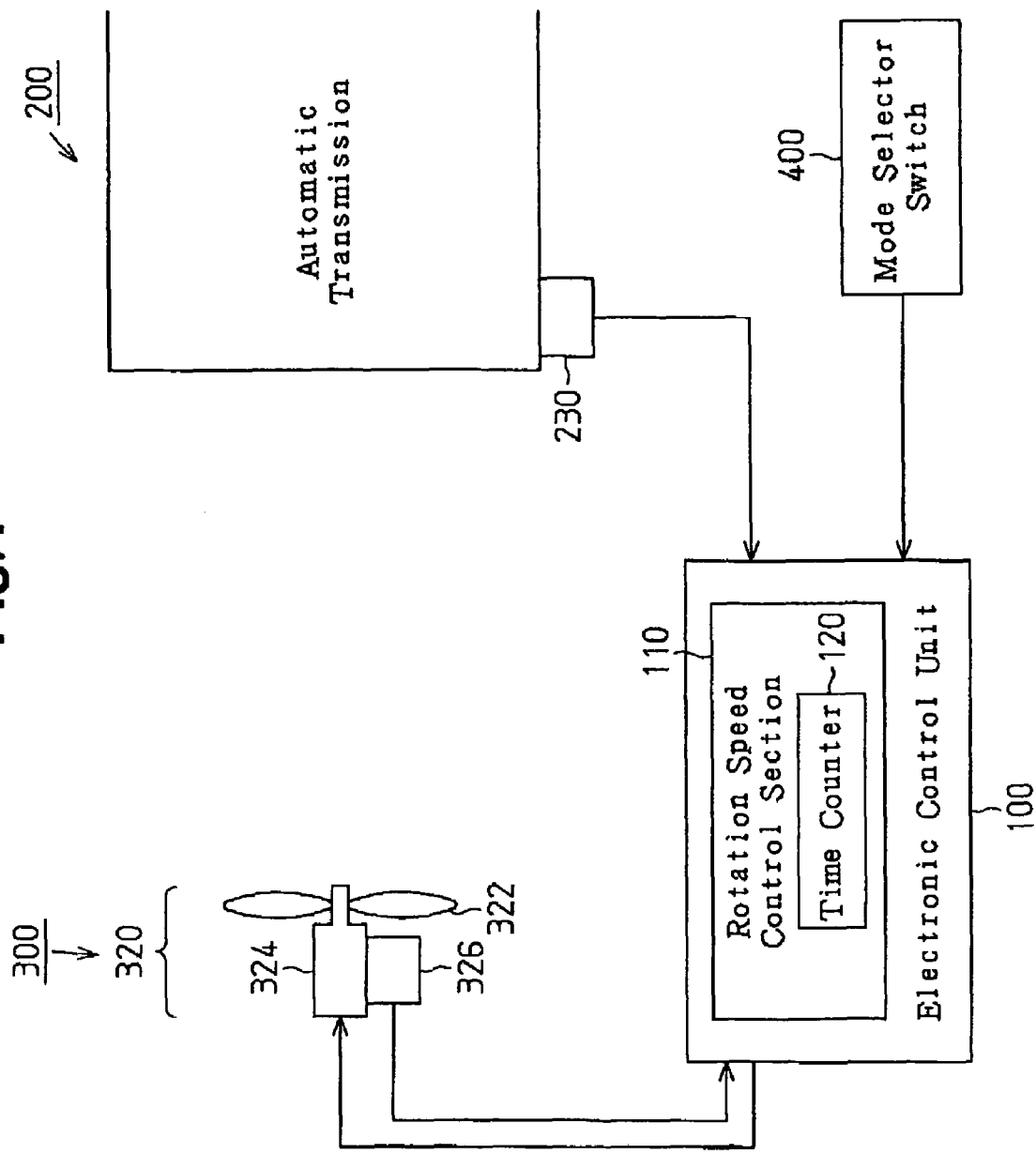
FIG. 1 is a block diagram showing a relationship between a fluid temperature regulator and its peripheral devices according to a first embodiment of the present invention.

FIG. 1 is a block diagram showing the relationship between an electronic control unit (controller) 100 as a fluid temperature regulator according to the present invention and its various peripheral devices.

The above various devices in the present embodiment are broadly formed of the electronic control unit 100, an automatic transmission 200, and a radiator 300.

As shown in FIG. 1, the radiator 300 is a cooling device for cooling an internal combustion engine and the automatic transmission 200, and includes a fan device 320.

The fan device 320 includes a fan 322 and a fan motor 324, and regulates the degrees of cooling of the internal combustion engine and the automatic transmission by changing the intensity of air flow generated by the fan 322.

The fan motor 324 is driven by electric power supplied from a battery (not shown) and rotates the fan 322 disposed at an output shaft of the fan motor 324. A rotation speed of the fan motor 324 is controlled by the electronic control unit 100. A rotation speed sensor 326 is provided to the fan motor 324, detects the rotation speed of the fan motor 324 and outputs a detection result to the electronic control unit 100.

The automatic transmission 200 includes a torque converter and an auxiliary transmission mechanism formed of a planetary gear and the like (not shown). Into the automatic transmission 200, automatic transmission fluid (ATF) is supplied as hydraulic fluid for driving the torque converter and the auxiliary transmission mechanism.

A fluid temperature sensor 230 is provided to the automatic transmission 200 and the fluid temperature sensor 230 detects a temperature To of the hydraulic fluid and outputs a detection result to the electronic control unit 100.

Figure 2:
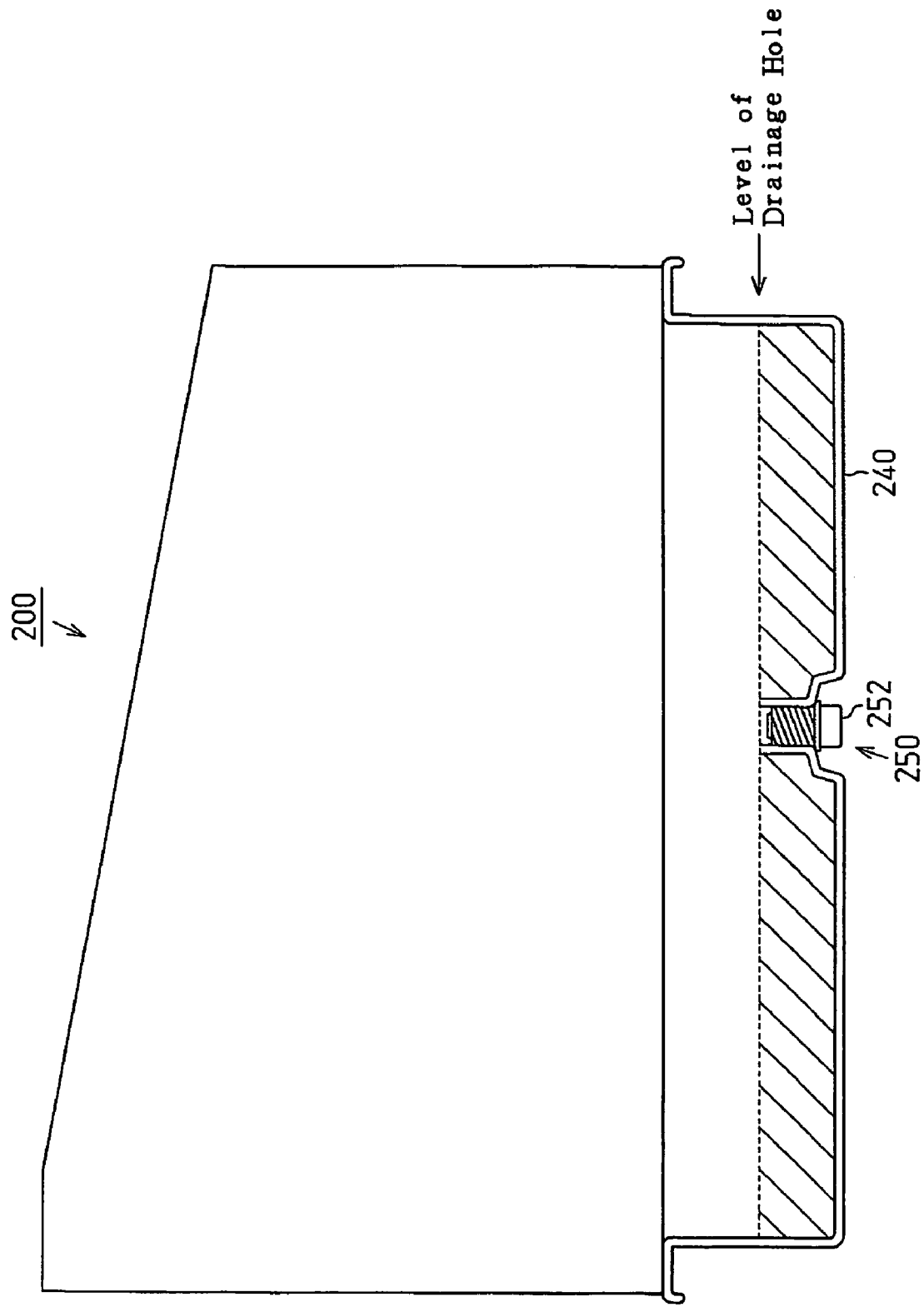
FIG. 2 is a cross-sectional view illustrating an automatic transmission and an oil pan.

FIG. 2 is a cross-sectional view showing an oil pan 240 provided to the automatic transmission 200.

As shown in FIG. 2, the oil pan 240 is disposed under the automatic transmission 200 and a drainage hole 250 is formed at a central portion of a bottom face of the oil pan 240. To put it concretely, the oil pan 240 protrudes inward to form the drainage hole 250 and an overflow plug 252 is disposed at an inner peripheral face of the drainage hole 250. In supplying the hydraulic fluid into the automatic transmission 200, it is necessary to carry out the fluid level regulation of the hydraulic fluid in a state where the hydraulic fluid is sufficiently distributed into the torque converter and the auxiliary transmission mechanism so as to ensure a proper amount of hydraulic fluid at actuation of the automatic transmission 200. Therefore, in the embodiment, the fluid level regulation is carried out when an operation state of the internal combustion engine is an idle state (e.g., an engine speed is 600 to 1100 rpm) and a shift range is a non-traveling range.

An operator who carries out the fluid level regulation of the hydraulic fluid detaches the overflow plug 252 attached to the drainage hole 250 to drain the hydraulic fluid through the drainage hole 250, and supplies the hydraulic fluid into the automatic transmission 200 through a hydraulic fluid supply hole (not shown). In the embodiment, an overflow system is employed so that the hydraulic fluid supplied after a sufficient amount of hydraulic fluid has been supplied into the automatic transmission 200 is drained outside through the drainage hole 250. By employing such a system, if the hydraulic fluid is supplied while a bottom face of the oil pan is in a horizontal state, a proper amount of hydraulic fluid is supplied into the automatic transmission 200 when the hydraulic fluid is supplied to a level of the drainage hole 250. When the fluid level regulation is completed, the operator attaches the overflow plug 252 to the drainage hole 250 again to thereby seal the oil pan and finish the operation.

As shown in FIG. 1, a mode selector switch 400 for switching between control modes of the rotation speed of the fan device 320 is provided in the vicinity of a driver's seat. Since the mode selector switch 400 is in an OFF state during traveling of the vehicle, the control mode of the rotation speed of the fan device 320, is a normal mode which will be described later.

On the other hand, in carrying out the fluid level regulation of the hydraulic fluid, the operator turns on the mode selector switch 400 to thereby switch the control mode of the rotation speed of the fan device 320 to an fluid level regulating mode which will be described later.

The electronic control unit 100 includes a rotation speed control section 110 for controlling the rotation speed of the fan device 320 according to the above-described respective control modes, and a time counter 120 for counting time which has elapsed since the fluid level regulation is started. The electronic control unit 100 is actuated by electric power supplied from a battery (not shown) and controls the rotation speed of the fan device 320 according to the above-described respective control modes. To put it concretely, when the control mode of the rotation speed of the fan device 320 is the normal mode, the electronic control unit 100 controls the rotation speed of the fan device 320 based on the operation state of the internal combustion engine. On the other hand, when the control mode of the rotation speed of the fan device 320 is the fluid level regulating mode, the electronic control unit 100 controls the rotation speed of the fan device 320 based on the temperature To of the hydraulic fluid output from the fluid temperature sensor 230 of the automatic transmission 200, or on the elapsed time Δt since the fluid regulation is started, which elapsed time Δt is counted by the time counter 120.

A control procedure of the rotation speed of the fan device 320 when the control mode of the rotation speed is the fluid level regulating mode will be described with reference to a flowchart in FIG. 3. A series of processes-shown in this flowchart is actually performed repeatedly in a predetermined cycle by the electronic control unit 100 during a period from the time when the control mode of the rotation speed of the fan device 320 is switched from the normal mode to the fluid level regulating mode until the time when the control mode is switched again from the fluid level regulating mode to the normal mode. In the embodiment, because temperature of the internal combustion engine is low immediately before the fluid level regulating operation is started, rotation of the fan device 320 is stopped until the fluid level regulating operation is started.

Figure 3:
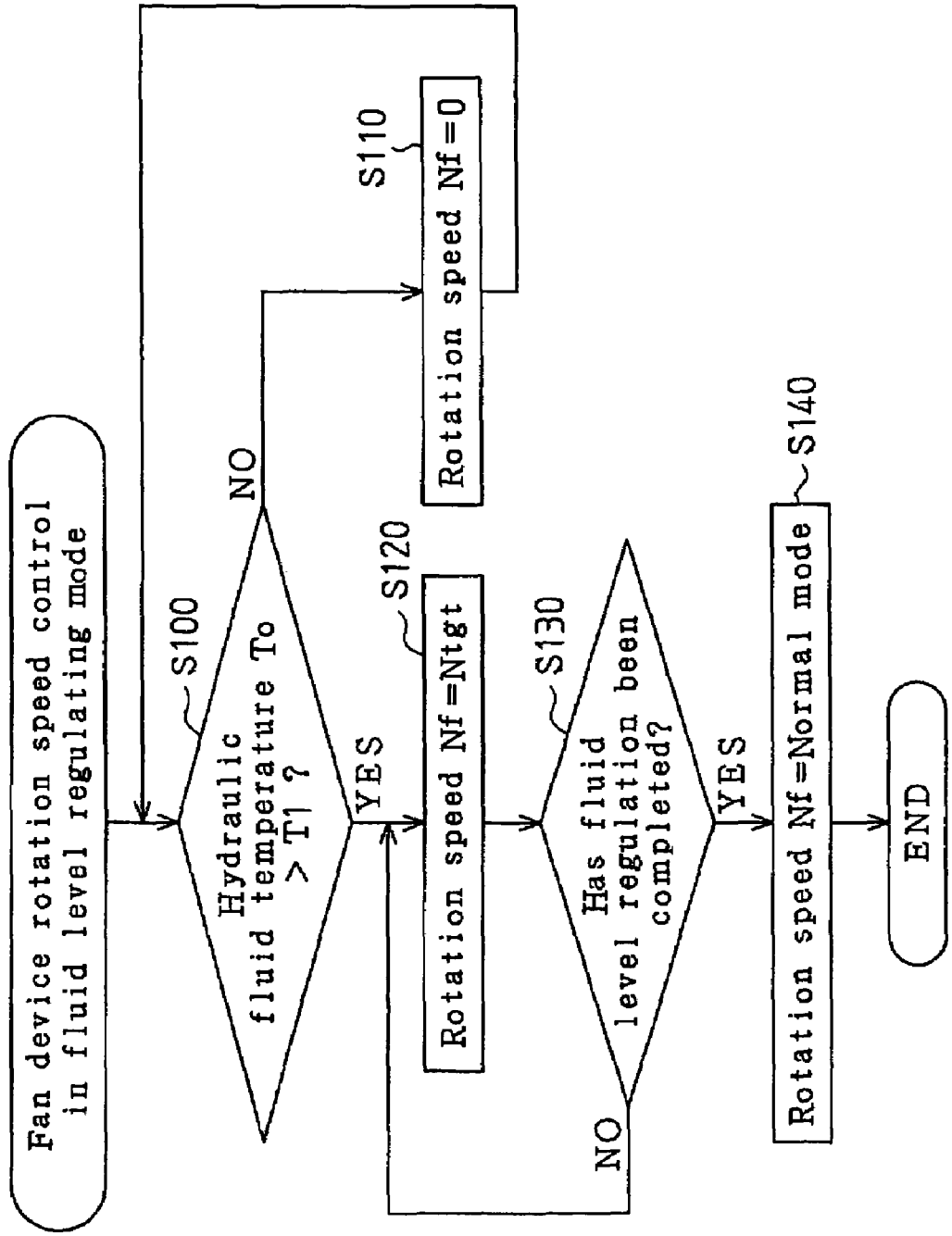
FIG. 3 is a flowchart showing a procedure of control process of the above fluid temperature regulator.

As shown in FIG. 3, in this series of processes, whether the temperature To of the hydraulic fluid is higher than a lower limit T1 (35° C.) of an acceptable range in the fluid level regulation is first determined (step 100).

Through this determination process, if it is determined that the temperature To of the hydraulic fluid is not higher than the lower limit T1 (step 100: NO), it is determined that the temperature of the hydraulic fluid needs to be further increased and a state in which the rotation of the fan device 320 is stopped is maintained (step 110).

On the other hand, through the determination process, if it is determined that the temperature To of the hydraulic fluid is higher than the lower limit T1 (step 100: YES), the rotation speed Nf of the fan device 320 is set to a target rotation speed Ntgt stored in memory in the rotation speed control section 110 (step 120). A value of the target rotation speed Ntgt is a value obtained by experiments for the internal combustion engine and the automatic transmission 200 mounted in the vehicle. The value of the target rotation speed Ntgt is set so that temperature rising speed ΔT/Δt of the hydraulic fluid becomes a target temperature rising speed C1 in the fluid level regulation by rotating the fan device 320 at the rotation speed Ntgt even when a degree of heating of the hydraulic fluid is different because the various structures of the internal combustion and the automatic transmission 200 are different.

If the rotation speed Nf of the fan device 320 is made equal to the target rotation speed Ntgt in this manner (step 120), whether the fluid level regulation has been completed is determined next (step 130). As described above, if the operator turns off the mode selector switch 400, it is determined that the fluid level regulation has been completed (step 130: YES) and the control mode of the rotation speed of the fan device 320 is switched to the normal mode (step 140).

On the other hand, through the above determination process, if it is determined that the fluid level regulation has not been completed (step 130: NO), the rotation speed of the fan device 320 is maintained at the target rotation speed Ntgt (step 120). Thus, the rotation speed Nf of the fan device 320 is maintained at the target rotation speed Ntgt until the fluid level regulation is completed.

Changes in the temperature of the hydraulic fluid based on the control of the rotation speed of the fan device 320 in the above-described fluid level regulating mode will be described with reference to FIG. 4 and in comparison with prior art.

Figure 4:
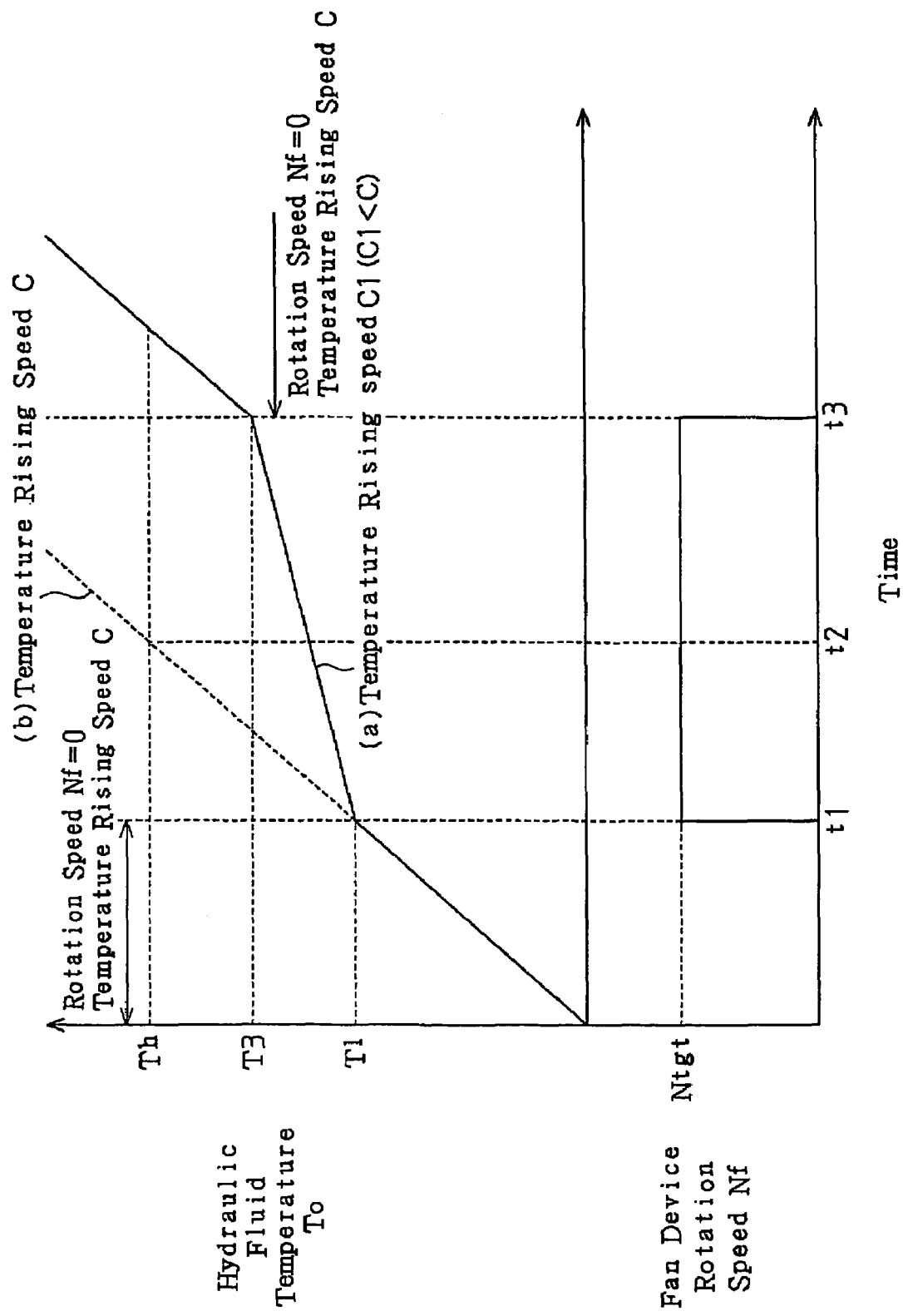
FIG. 4 is a time chart showing changes in the temperature of hydraulic fluid and rotation speed of a fan device over time.

FIG. 4 shows changes over time in the temperature of the hydraulic fluid. Solid line (a) shows changes over time in the temperature To of the hydraulic fluid under control by the fluid temperature regulator of the embodiment. Broken line (b) shows changes over time in temperature To of the hydraulic fluid according to a prior-art fluid level regulating method of the hydraulic fluid in which the fan device 320 is not rotated during fluid level regulation.

If operation of the internal combustion engine is started, the temperature To of the hydraulic fluid rises at a temperature rising speed C with the passage of time as shown in FIG. 4.

If the fan device 320 is not rotated during the fluid level regulation, the temperature To of the hydraulic fluid continues to rise at the same temperature rising speed C with the passage of time even after the temperature To reaches the lower limit T of the acceptable range in the fluid level regulation as shown in broken line (b) of FIG. 4. Therefore, at a time point (time t2) earlier than time t3 at which a normal operation time of the fluid level regulation carried out by the operator has passed, the temperature To of the hydraulic fluid exceeds an upper limit Th (45° C.) of the acceptable range in the fluid level regulation. In this case, because the fan device 320 is controlled according to the operation state of the internal combustion engine, the fan device 320 is not rotated until a warming-up of the internal combustion is completed.

On the other hand, if the control by the fluid temperature regulator of the embodiment is performed to carry out the fluid level regulation of the hydraulic fluid, the operator switches the control mode of the rotation speed of the fan device 320 from the normal mode to the hydraulic level regulating mode prior to the fluid level regulation as described above. Thus, in a state in which the control mode of the fan device 320 is the fluid level regulating mode, if the temperature To of the hydraulic fluid reaches the lower limit T1 of the acceptable range in the fluid level regulation (time t1), the fan device 320 is rotated at target rotation speed Ntgt so as to control the temperature rising speed of the hydraulic fluid the fluid level of which is being regulated. As a result, the temperature To of the hydraulic fluid rises at temperature rising speed C1 lower than the temperature rising speed C at which the temperature To has risen. In this manner, the temperature To of the hydraulic fluid at the time point (time t3) at which the normal operation time of the fluid level regulation carried out by the operator has passed becomes a medium value T3 between the lower limit T1 and the upper limit Tb. If the fluid level regulation is completed (time t3), the operator switches the control mode of the fan device 320 again from the fluid level regulating mode to the normal mode and therefore the rotation of the fan device 320 is stopped and the temperature To of the hydraulic fluid rises at the temperature rising speed C.

With the above-described embodiment, the following advantages are obtained.

(1) With the embodiment, in the fluid temperature regulator for regulating the temperature of the hydraulic fluid circulated in the automatic transmission 200, the degree of cooling of the hydraulic fluid is controlled so that the temperature To for actuation falls within the acceptable range in carrying out the fluid level-regulation of the hydraulic fluid during operation of the internal combustion engine. As a result, even if the hydraulic fluid is heated while the fluid level regulation is carried out during operation of the internal combustion engine, the temperature To of the hydraulic fluid falls within the allowable range in the fluid level regulation, and an increase in volume of the hydraulic fluid due to thermal expansion falls within acceptable range. Therefore, the fluid level regulation of the hydraulic fluid during operation of the internal combustion engine can be carried out accurately.

(2) A method of controlling the degree of cooling of the hydraulic fluid so that the temperature rising speed of the hydraulic fluid becomes the target temperature rising speed in the fluid level regulation is employed. Thus, even when a degree of heating of the hydraulic fluid is different depending on the various structures of the internal combustion and the automatic transmission, for example, cooling speed of the hydraulic fluid is controlled so that the temperature rising speed of the hydraulic fluid becomes the target temperature rising speed. Therefore, if the temperature T1 of the hydraulic fluid when the fluid level regulation of the hydraulic fluid is started is determined, it is possible to make the temperature of the hydraulic fluid when the predetermined time has passed since the fluid level regulation was started agree with the target temperature T3.

A fluid level regulating method and a fluid temperature regulator for an automatic transmission according to a second embodiment of the present invention will be described with reference to FIGS. 5 and 6. The present embodiment is different from the first embodiment in that the rotation speed of the fan device 320 is feedback-controlled so that the temperature To of the hydraulic fluid becomes the target temperature T3. The fluid temperature regulator according to the embodiment includes a structure shown in FIG. 1 similarly to the first embodiment. Mainly the differences will be described below. In the second embodiment too, because the temperature of the internal combustion engine is low immediately before the fluid level regulating operation is started, rotation of the fan device 320 is stopped until the fluid level regulating operation is started.

Figure 5:
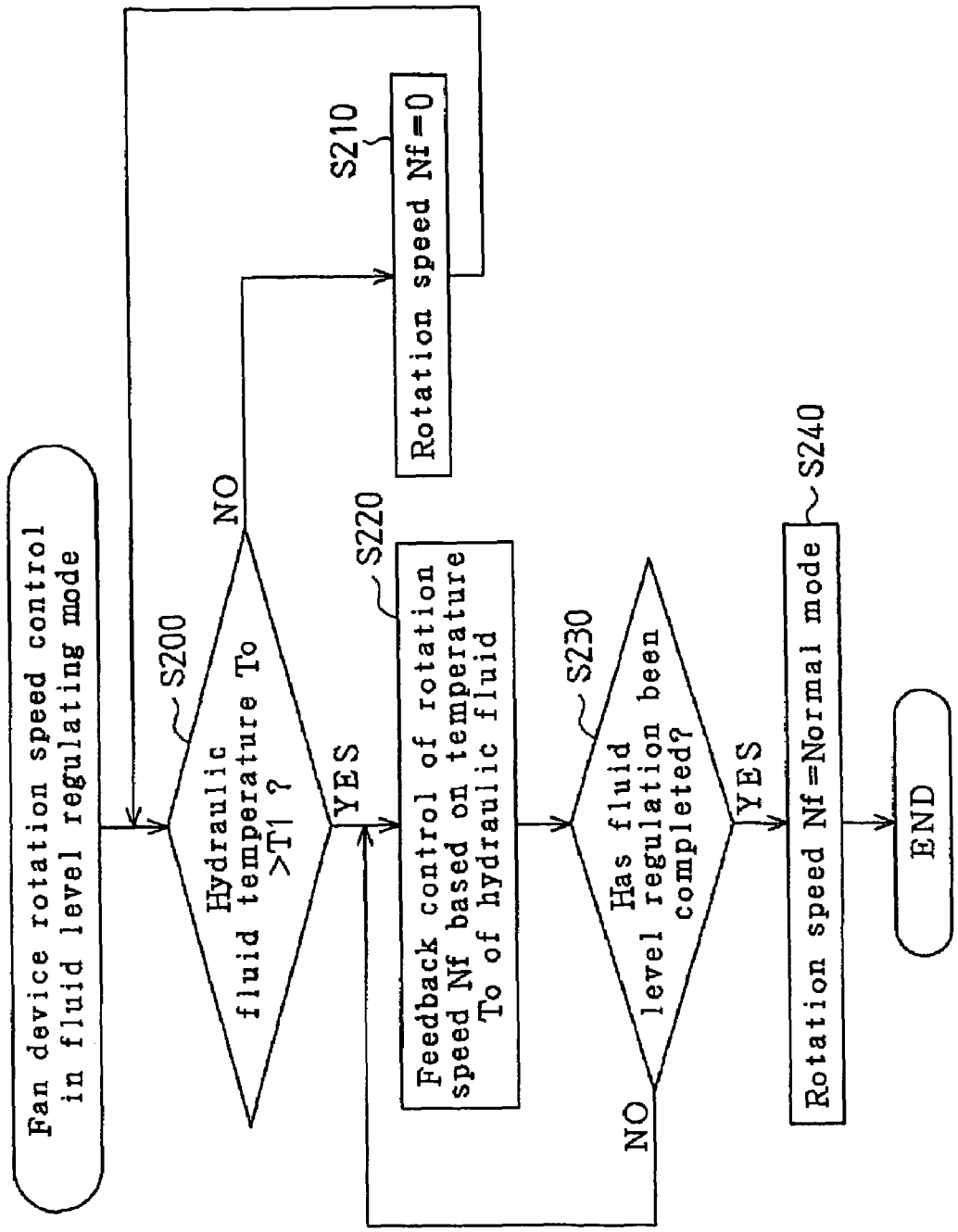
FIG. 5 is a flowchart showing a procedure of control process of a fluid temperature regulator according to a second embodiment of the present invention.

As shown in FIG. 5, in this process, whether the temperature To of the hydraulic fluid is higher than a lower limit T1 (35° C.) of an acceptable range in the fluid level regulation is determined first (step 200).

Through this determination process, if it is determined that the temperature To of the hydraulic fluid is not higher than the lower limit T1 (step 200: NO), it is determined that the temperature To of the hydraulic fluid needs to be further increased and a state in which the rotation of the fan device 320 is stopped is maintained (step 210).

On the other hand, through the above determination process, if it is determined that the temperature To of the hydraulic fluid is higher than the lower limit T1 (step 200: YES), the rotation speed Nf of the fan device 320 is feedback-controlled so that the temperature To of the hydraulic fluid becomes the target temperature T3 (step 220). To put it concretely, a value of the rotation speed Nf of the fan device 320 is increased or decreased so that a deviation of the temperature To of the hydraulic fluid output from the fluid temperature sensor 230 and the target temperature T3 from each other becomes zero.

When the temperature To of the hydraulic fluid becomes the target temperature T3 by feedback control of the rotation speed Nf of the fan device 320 as described above, whether the fluid level regulation has been completed is determined next (step 230). As described above, it is determined that the fluid level regulation has been completed when the operator turns off the mode selector switch 400 (step 230: YES) and the control mode of the rotation speed of the fan device 320 is switched to the normal mode (step 240).

On the other hand, if it is determined that the fluid level regulation has not been completed (step 230: NO) through the above determination process, the above feedback control is continued (step 220). Thus, the rotation speed Nf of the fan device 320 is feedback-controlled until the fluid level regulation is completed to thereby maintain the temperature To of the hydraulic fluid at the target temperature T3.

Changes in the temperature of the hydraulic fluid based on the control of the rotation speed of the fan device 320 in the above-described fluid level regulating mode will be described with reference to FIG. 6. FIG. 6 shows the changes over time in the temperature of the hydraulic fluid. Solid line (c) shows the change over time in the temperature To of the hydraulic fluid in the control of the fluid temperature regulator of this embodiment.

If operation of the internal combustion engine is started, as shown in FIG. 6, the temperature To of the hydraulic fluid rises at temperature rising speed C with the passage of time.

If the fluid level regulation of the hydraulic fluid is carried out while performing the control by the fluid temperature regulator of this embodiment, the operator switches the control mode of the rotation speed of the fan device 320 from the normal mode to the fluid level regulating mode prior to the fluid level regulation as described above. Thus, in a state in which the control mode of the fan device 320 is the fluid level regulating mode, when the temperature To of the hydraulic fluid reaches the lower limit T1 of the acceptable range in the fluid level regulation (time t1), the rotation speed Nf of the fan device 320 is feedback-controlled so that the temperature To of the hydraulic fluid becomes the target temperature T3. In this manner, the temperature To of the hydraulic fluid at the time point (time t3) at which the normal operation time t3 of the fluid level regulation carried out by the operator has passed becomes target temperature T3 which is a medium value between the lower limit T1 and the upper limit Th. If the fluid level regulation is completed (time t3), the operator switches the control mode of the fan device 320 again from the fluid level regulating mode to the normal mode and therefore the rotation of the fan device 320 is stopped and the temperature To of the hydraulic fluid rises at the temperature rising speed C.

With the above-described embodiment, the following advantages are obtained.

(1) With this embodiment, in addition to the similar advantages to those of the first embodiment, the following advantage can be obtained. In other words, a method of controlling a degree of cooling of the hydraulic fluid so that the temperature To of the hydraulic fluid becomes the target temperature T3 in the fluid level regulation is employed. As a result, because it is possible to make the temperature To of the hydraulic fluid in the fluid level regulation agree with the target temperature T3, the temperature of the hydraulic fluid does not rise even when the operation time of the fluid level regulation becomes long, for example. Therefore, it is possible to further accurately carry out the fluid level regulation of the hydraulic fluid.

A fluid level regulating method and a fluid temperature regulator for an automatic transmission according to a third embodiment of the present invention will be described with reference to FIG. 7. The present embodiment is different from the first embodiment and the second embodiment in that heat is exchanged between coolant of the internal combustion engine and the hydraulic fluid.

Mainly the differences will be described below. As the manner of control of the fan device 320, those employed in the above-described first embodiment and second embodiment may be used.

FIG. 7 is a block diagram showing a relationship between an electronic control unit 100 as a fluid temperature regulator according to the invention and its peripheral equipment.

The above various devices in the present embodiment are also broadly formed of the electronic control unit 100, an automatic transmission 200, and a radiator 300.

As shown in FIG. 7, the radiator 300 is a cooling device for cooling the coolant of the internal combustion engine, and includes a radiator core 310 and a fan device 320.

The radiator core 310 includes tubules (not shown) through which the coolant is passed and a large number of fins for increasing a contact area with outside air are provided about the tubules so as to facilitate heat radiation from the coolant when the coolant passes through the tubules. A coolant passage 330 is connected to the tubules of the radiator core 310 and the heated coolant is sent into interior of the radiator core 310 through the coolant passage 330. The temperature of the coolant is regulated when the coolant passes through interior of the radiator core 310 and the coolant is supplied to the internal combustion engine and the automatic transmission 200 again through the coolant passage 330.

The fan device 320 is for regulating a degree of cooling of the coolant by changing force of fan air for cooling the radiator core 310, and includes a fan 322 and a fan motor 324.

The fan motor 324 is driven by electric power supplied from a battery (not shown) and rotates the fan 322 disposed at an output shaft of the fan motor 324. A rotation speed of the fan motor 324 is controlled by the electronic control unit 100 which will be described later. A rotation speed sensor 326 is provided to the fan motor 324 and the rotation speed sensor 326 detects the rotation speed of the fan motor 324 and outputs a detection result to the electronic control unit 100.

The automatic transmission 200 is provided with a hydraulic fluid passage 210 and a heat exchanger 220 as shown in FIG. 1. The above-described coolant passage 330 and the hydraulic fluid passage 210 are led into the heat exchanger 220 and the hydraulic fluid heated by frictional heat and the like is cooled by the coolant in the heat exchanger 220.

A fluid temperature sensor 230 is provided to the automatic transmission 200 and the fluid temperature sensor 230 detects a temperature To of the hydraulic fluid and outputs a detection result to the electronic control unit 100.

With this embodiment, the following advantages are obtained.

(1) With this embodiment, in addition to the similar advantages to those of the first embodiment and the second embodiment, the following advantage is obtained. In other words, the hydraulic fluid is cooled by circulation of the coolant of the internal combustion engine through the automatic transmission and the degree of cooling of the hydraulic fluid is controlled by controlling the rotation speed of the fan device 320 of the internal combustion engine. Thus, by diverting the fan device 320 of the internal combustion engine which is normally used for cooling the hydraulic fluid during operation of the internal combustion engine, the above-described control of the degree of cooling of the hydraulic fluid can be carried out during the fluid level regulation of the hydraulic fluid. Therefore, it is possible to carry out the fluid temperature regulation without adding a special arrangement.

The above embodiments may be modified as follows.

An object of control by the fluid level regulating method and the fluid temperature regulator for the automatic transmission 200 according to the invention is not limited to the fan device 320 of the internal combustion engine described in the embodiments. For example, it is also possible to provide a radiator (cooling device) for cooling the hydraulic fluid of the automatic transmission 200 separately from the radiator 300 of the internal combustion engine and to control a rotation speed of a fan device for cooling the radiator. In short, any configuration may be applied as long as the degree of cooling of the hydraulic fluid is controlled so that the temperature of the hydraulic fluid falls within the acceptable range in carrying out the fluid level regulation of the hydraulic fluid during operation of the internal combustion engine.

In the first embodiment, even when the rotation speed Nf of the fan device 320 is set at the target rotation speed Ntgt, the temperature rising speed of the hydraulic fluid may not become the target temperature rising speed C1 depending on factors such as the outside air temperature of the fan device 320, and the degree of heating of the hydraulic fluid in some cases. In such a case, if the rotation speed of the fan device 320 is feedback-controlled so as to make the temperature rising speed of the hydraulic fluid agree with the target temperature rising speed C1, it is possible to make the temperature rising speed of the hydraulic fluid agree with the target temperature rising speed C1.

Although the temperature To of the hydraulic fluid is set to the target temperature T3 by the feedback control in the second embodiment, it is also possible to achieve this by so-called open-loop control.

The invention claimed is:

1. A method for regulating a fluid level of hydraulic fluid circulated in an automatic transmission while an internal combustion engine is running, the method comprising:
   cooling the hydraulic fluid when the fluid level is regulated; and
   controlling the degree of cooling of the hydraulic fluid such that the temperature of the hydraulic fluid falls within an acceptable range.

2. The method according to claim 1, wherein the control of the degree of cooling includes controlling the degree of cooling of the hydraulic fluid such that a temperature rising speed of the hydraulic fluid becomes a target temperature rising speed in the fluid level regulation.

3. The method according to claim 1, further comprising starting the cooling of the hydraulic fluid when the temperature of the hydraulic fluid reaches a lower limit of the acceptable range,
   wherein the control of the degree of cooling includes controlling the degree of cooling of the hydraulic fluid such that the temperature of the hydraulic fluid increases at a temperature rising speed lower than the temperature rising speed at which the temperature of the hydraulic fluid has reached the lower limit.

4. The method according to claim 1, further comprising starting the cooling of the hydraulic fluid when the temperature of the hydraulic fluid reaches a lower limit of the acceptable range,
   wherein the control of the degree of cooling includes controlling the degree of cooling of the hydraulic fluid such that the temperature of the hydraulic fluid becomes a target value set between the lower limit and an upper limit of the acceptable range when a predetermined time has passed from the start of the cooling.

5. The method according to claim 1, wherein the control of the degree of cooling includes controlling the degree of cooling of the hydraulic fluid such that the temperature of the hydraulic fluid becomes a target temperature in the fluid level regulation.

6. The method according to claim 5, wherein the control of the degree of cooling includes:
   detecting the temperature of the hydraulic fluid; and
   controlling the degree of cooling of the hydraulic fluid based on the detected temperature such that the detected temperature becomes the target temperature.

7. The method according to claim 1, wherein the cooling of the hydraulic fluid includes cooling the hydraulic fluid with coolant circulated in the engine, and
   wherein the control of the degree of cooling includes controlling a rotation speed of a fan device provided in a radiator for cooling the coolant.

8. A temperature regulator that regulates a temperature of hydraulic fluid circulated in an automatic transmission coupled to an internal combustion engine, the regulator comprising:
   a cooling device for cooling the hydraulic fluid; and
   a controller, wherein, when a fluid level of the hydraulic fluid is regulated while the engine is running, the controller controls the cooling device thereby regulating the degree of cooling of the hydraulic fluid such that the temperature of the hydraulic fluid falls within an acceptable range.

9. The regulator according to claim 8, wherein the controller controls the cooling device such that a temperature rising speed of the hydraulic fluid becomes a target temperature rising speed in the fluid level regulation.

10. The regulator according to claim 8, wherein the controller activates the cooling device to start the cooling of the hydraulic fluid when the temperature of the hydraulic fluid reaches a lower limit of the acceptable range, and controls the cooling device such that the temperature of the hydraulic fluid increases at a temperature rising speed lower than the temperature rising speed at which the temperature of the hydraulic fluid has reached the lower limit.

11. The regulator according to claim 8, wherein the controller activates the cooling device to start the cooling of the hydraulic fluid when the temperature of the hydraulic fluid reaches a lower limit of the acceptable range, and controls the cooling device such that the temperature of the hydraulic fluid becomes a target value set between the lower limit and an upper limit of the acceptable range when a predetermined time has passed from the start of the cooling.

12. The regulator according to claim 8, wherein the controller controls the cooling device such that the temperature of the hydraulic fluid becomes a target temperature in the fluid level regulation.

13. The regulator according to claim 12, further comprising a fluid temperature sensor detecting the temperature of the hydraulic fluid, wherein the controller controls the cooling device based on the detected temperature such that the detected temperature becomes the target temperature.

14. The regulator according to claim 8, wherein the cooling device includes a radiator that cools coolant circulated in the engine, the hydraulic fluid being cooled by the coolant, and
   wherein the controller controls a rotation speed of a fan device provided in the radiator.

* * * * *